June 19, 1951 G. V. NOLDE 2,557,457
MULTIPLYING MACHINE

Original Filed March 1, 1948 9 Sheets-Sheet 1

FIG_1_

INVENTOR
George V. Nolde
BY
Howard M. Austin

June 19, 1951  G. V. NOLDE  2,557,457
MULTIPLYING MACHINE
Original Filed March 1, 1948  9 Sheets-Sheet 2

INVENTOR
George V. Nolde
BY
Howard M. Dustin

FIG_4

FIG_5

June 19, 1951  G. V. NOLDE  2,557,457
MULTIPLYING MACHINE
Original Filed March 1, 1948  9 Sheets-Sheet 6

FIG. 9.

INVENTOR
George V. Nolde
BY
Howard M. Austin

June 19, 1951  G. V. NOLDE  2,557,457
MULTIPLYING MACHINE
Original Filed March 1, 1948  9 Sheets-Sheet 7

FIG_10_

FIG_11_

FIG_12_

INVENTOR
George V. Nolde
BY
Howard M. Dustin

June 19, 1951  G. V. NOLDE  2,557,457
MULTIPLYING MACHINE
Original Filed March 1, 1948  9 Sheets-Sheet 8

INVENTOR
George V. Nolde.
BY
Howard M. Austin

Patented June 19, 1951

2,557,457

UNITED STATES PATENT OFFICE 2,557,457

MULTIPLYING MACHINE

George V. Nolde, Berkeley, Calif., assignor to Marchant Calculating Machine Company, a corporation of California Original application March 1, 1948, Serial No. 12,232. Divided and this application December 11, 1948, Serial No. 64,819

6 Claims. (Cl. 235—79)

This invention relates to calculating machines and is concerned more particularly with improved machines of this character which employ automatic mechanisms for performing multiplication calculations.

The present application is a division of the George V. Nolde application Serial Number 12,232, filed March first, 1948.

Machines capable of performing multiplication calculations include a multi-order accumulator register or the equivalent for registering the products of multiplication calculations, and also include mechanical or electrical devices for actuating the accumulator register during the registering or calculating operations. These devices are set by, or are under control of, selection mechanisms and usually possess a fewer number of orders than are included in the accumulator register so that the respective orders of the actuating devices can be associated with, or shifted relative to, the various orders of the accumulator. Heretofore it has been necessary to repeatedly interrupt the registering operations during all or a large part of such shifting operations.

The machine of the present invention includes a plurality of ordinally arranged differential actuators, one permanently associated with each respective ordinal numeral wheel of the accumulator register so that there is no need for causing relative shifting between the actuator and accumulator to effect the entry of values into various orders of the accumulator.

A shiftable selection storage mechanism having a lesser number of orders than there are ordinal actuators is set in accordance with the digital values selected for one factor of a calculation, and, in turn, sets the ordinal actuators aligned therewith so that the latter will drive the numeral wheels by the amounts set in the respective orders of the storage mechanism. This setting of the actuators is maintained throughout the current actuating or registering operation and during such operation the selection storage mechanism may be shifted to its next ordinal position in preparation for resetting the actuators at the beginning of the next registering operation. The shifting of the selection storage mechanism does not affect the previous setting of the actuators; therefore, a shifting operation occurs during the registering operation without delaying the successive operations of the actuating mechanism.

The underlying principle of the present invention is to operate the differential actuators through a series of ordinal multiplications without causing any delays for ordinal shifting operations.

The principal object, therefore, is to perform a plural order multiplying calculation in substantially the time required for the setting and driving of the differential actuators.

Another object is to shift a multiplier control element from one ordinal position to the next ordinal position during an ordinal multiplying operation and upon conclusion of the multiplying operation to enable said element to control the next ordinal multiplication.

Another object is to shift a multiplicand selection storing device from one of a series of ordinal controlling positions to the next during an ordinal multiplying operation.

Still another object is to initiate one or more shifting operations during an ordinal multiplying operation.

Other objects and advantages of the invention will be apparent from the following description of a preferred embodiment of the invention, as illustrated in the accompanying drawings, in which.

General description

Figure 1:
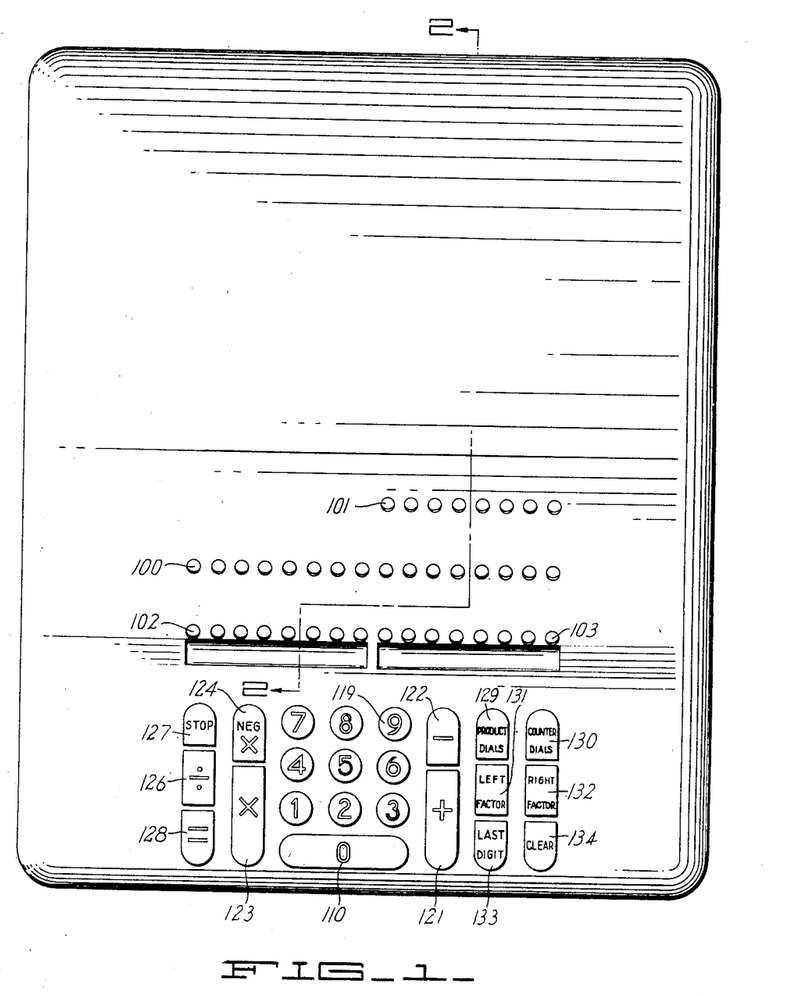
Fig. 1 is an exterior plan view of the calculating machine embodying the instant invention.

Fig. 1 of the drawings illustrates a plan view of the calculating machine embodying the instant invention. A machine of the ten-key keyboard type of the general character disclosed in the Avery patent application, Serial Number 506,519, filed October 16, 1943 (Patent No. 2,467,419 issued April 19, 1949) has been selected for illustration of such invention.

Generally, the calculating machine includes an accumulator or product register 100, a revolutions counter register 101, and two factor indicators 102 and 103. Indicator 102 indicates the values selected in addition and subtraction, and also indicates the multiplicand in multiplication, while indicator 103 shows the multiplier values selected. Values may be introduced into the indicators 102 and 103 under the control of a common ten-key keyboard comprising the keys 110 to 119, respectively.

Where single items are to be entered into the accumulator 100 as in adding and subtracting operations, the entry is effected under the control of an add key 121 or a subtract key 122. Where a multiplying operation is to be performed in a positive fashion the positive multiplication key 123 is provided to condition the machine for operation under the control of multiplier entry keys, while the negative multiplication key 124 conditions the machine for multiplication under the control of the same multiplier entry keys with subtraction of the product from the value standing in the regitser 100. In multiplication, the keys 110 to 119 when related to the multiplier register 103 become multiplier keys and serve to start machine operations.

For effecting individual resetting or clearing of the various registers and/or indicators, a clear key 129 marked "Product Dials" is provided for the register 100, a key 130 marked "Counter Dials" for the register 101, a key 131 marked "Left Factor" for the indicator 102, a key marked "Right Factor" for the indicator 103. The key 133 marked "Last Digit" is employed for clearing one or more of the last digits entered into the left or right factor indicators 102 or 103. The keys 129 through 132 and the mechanisms controlled thereby are conventional and will not be described herein. The entire machine may be restored to "zero" or normalized condition by operation of the clear key 134 as described in the application Serial Number 12,232 of which this is a division.

Selection mechanism

Depression of a value key 110—119 enters the value selected into one order of a plural order selection storing mechanism through the intermediary of a single order selection set-up carriage. Release of the depressed key allows the carriage to escape to the next adjacent order of the selection storing mechanism to allow the next entry. By successive depressions of the value keys 110—119, a plural order factor may be set-up in the selection storing mechanisms. The storing mechanism establishes a mechanical representation of the values selected and which mechanical representation is used to adjust the numeral wheel actuating means in accordance with the selected values. In multiplying operations the selection storing mechanism, disclosed in the form of a carriage, may be shifted relative to the actuating means in order to control the latter for entry of the stored values into any orders of the accumulator.

The selection set-up mechanism is also used as an intermediary in entering the multiplier factor into the machine. In multiplication, the selection setting carriage connects the keys 110—119 and the multiplier control mechanism, so that, in effect the keys become multiplier operation control keys.

Figure 2:
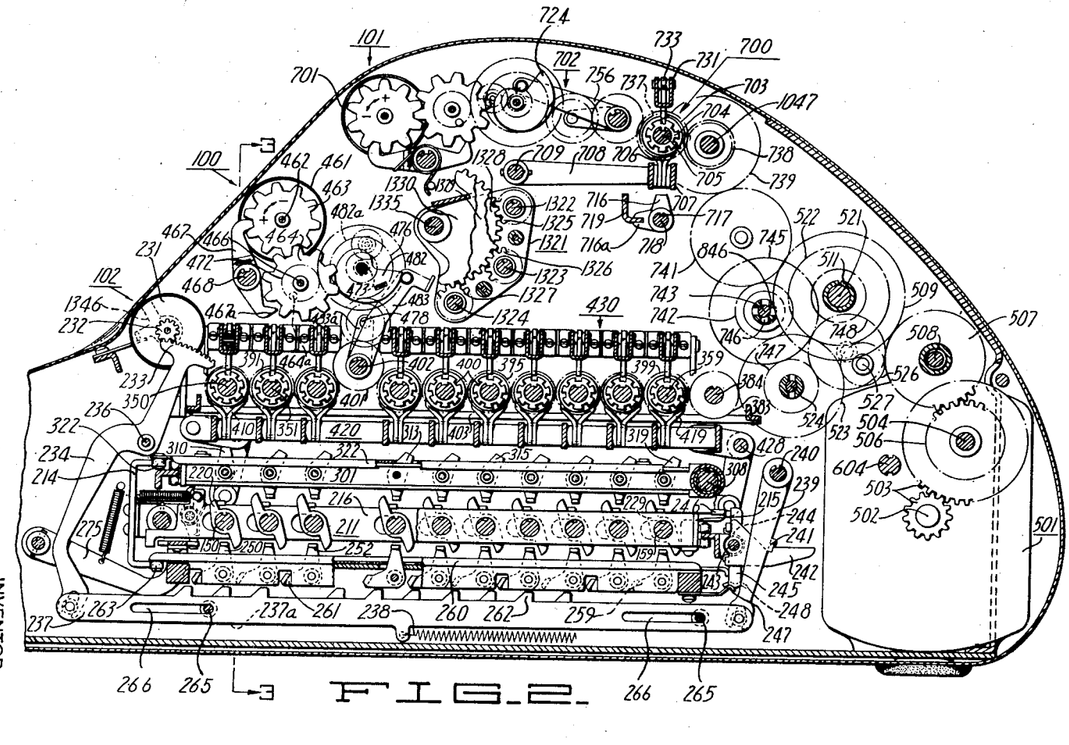
Fig. 2 is a longitudinal section as viewed from the right and taken on the line 2—2 of Fig. 1, showing the general arrangement of the machine, the keyboard being omitted.

To enable control of the keyboard over the shiftable single order selection set-up carriage, the respective keys 110 to 119, which correspond to the values "0" to "9", inclusive, are connected through suitable linkages with a series of rockable selection shafts 150 through 159, respectively (Fig. 2), which also correspond to the values "0" to "9", inclusive.

The respective elements 220 to 229 are slideably keyed to the shafts and are carried by a shiftable single order set-up carriage 211. The setting lever 220 to 229 which is rocked by its respective key, rocks a blocking lever 310 to 319 into a position in which it later causes engagement of a respective one of an ordinal row of clutches 400. The downwardly extending arm of the setting lever 220 to 229 is concurrently operable to set a respective one of the blocking interponents 250 to 259 which in turn control the movement of a selection bar 237—237a and limit the rotation of the factor indicator numeral wheel 231 to a position corresponding to the value of the key depressed. The depression of a numeral key also causes escapement of the set-up carriage 211 which moves one order toward the right and into alignment with the next ordinal row of blocking levers 310 to 319 and the corresponding ordinal row of blocking interponents 250 to 259 whereupon depression of another numeral key will cause a similar setting of the next digit into the storing carriage 301 and the next lower order numeral wheel 231, all as described in detail in said Nolde application. Reference may be had to the above application for a complete disclosure of the parts of the machine not specifically described herein; it being noted that parts shown in the drawings, but not described in this specification will be found to bear the same reference numerals used to identify the corresponding parts in said application. The parts identified by the same reference numerals in the drawings of this application operate exactly as shown and described in said application.

Actuators

The above mentioned blocking levers 310 to 319 are each effective to control the engagement of a respective one of the differential clutches 400. There is a row of such clutches for each product numeral wheel 461 (Fig. 3), there being usually twice the number of product numeral wheels as there are orders in the selection storing carriage. During a multi-order operation such as multiplication which requires changing the ordinal relationship between the multiplicand and the product register, the storing carriage 301 is shifted one order toward the right during each ordinal operation to associate the multiplicand set therein with the successively lower orders of the register. The differential clutches 400 each include a drive and a driven element. The drive elements 408 are mounted for limited sliding movement upon their respective shafts 350 to 359 and in each order, one of the elements is moved into engagement with a driven element 407 by an associated fork 410—419. These forks are carried by a clutch engaging frame 420 which is mounted for up and down movement under the control of a setting clutch which operates prior to each operation of the main clutch. Downward movement of the clutch engaging frame 420 brings the substantially horizontal lower surface of the fork against the blocking lever 310 to 319 previously moved into blocking position by a numeral key, and in so doing the fork is rocked clockwise to engage the teeth of the clutch driving element 408 with the single tooth of a clutch driven element 407 and thus cause engagement of the selected one of the numeral wheel clutches 400.

Figures 3, 3A:
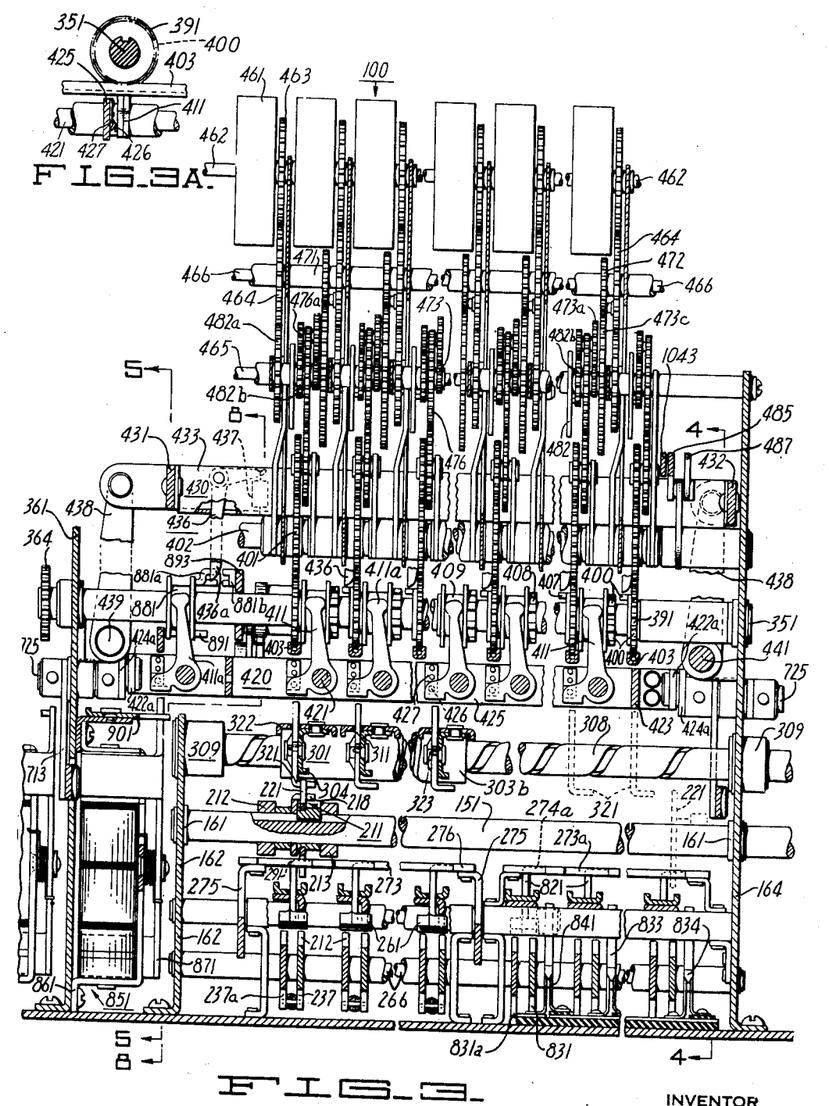
Fig. 3 is an enlarged section as seen from the front of the machine and taken on line 3—3 of Fig. 2.
Fig. 3A is an enlarged right side view of a portion of the mechanism shown in Fig. 3.

Concurrent with the operation of the clutch engaging frame 420, a clutch disengaging frame generally designated at 430 (Figs. 2 and 3), is moved toward the left as viewed in Fig. 3 by the setting clutch to disengage any previously set clutches 400 and is returned toward the right before the clutch engaging frame 420 is moved upwardly to ineffective position so as not to disengage any clutches currently being set.

The selection storing carriage 301 (Fig. 2) is suitably mounted in the machine for shifting relative to various orders of the differential clutches 400. Shifting is effected through a worm nut 303b (Fig. 3) connected to the carriage 301 and engaged in the thread of worm shaft 306 which is rotated by operation of a shift clutch described hereinafter.

For convenience the clutches shown in the various parts of the drawings and referred to hereinafter are identified by characteristic letters such as M. C. for main clutch, S. C. for setting clutch, and Sh. C. for shift clutch. The cams driven by the respective clutches and the solenoids and clutch control dogs which cause engagement and disengagement of the respective clutches are also identified by similar letters.

A gear train (not shown) including a drive reverse unit connects the main clutch 515 (Fig. 9) to gear 383, freely mounted on idler shaft 384, and which gear is enmeshed with a series of compound drive gears for the shafts 351—359. The gear train on the ends of shafts 351—359 is such that proportional movements are transmitted to the shafts and their respective clutches 400 (Fig. 2) in ratios according to the values "1" to "9", respectively, so that when one of these drives is transmitted to an aligned numeral wheel 461, that numeral wheel will be driven from 1 to 9 digital increments in accordance with the digital value to be entered in that order. If a zero is selected in an order, the "0" clutch 400 is engaged and the fixed shaft 350 serves as a lock to prevent rotation of the numeral wheel during idle rotation of the other shafts 351—359. A spring detent 427 (Fig. 3A) fixed to a cross member 425 of the clutch engaging frame cooperates with a pin 426 carried by the clutch engaging fork to hold the fork and a respective clutch 400 in either its engaged or disengaged position.

Each driven element 407 (Fig. 3) of the clutches 400 carries a respective gear 390—399 (Fig. 2), and each ordinal series of gears 390—399 is enmeshed to form an idler gear train. Enmeshed with the idler gear train 390—399 is a drive receiving gear 401 journaled on a shaft 402. The drive from gear 401 is transmitted to an associated numeral wheel 461 through the crawl carry gearing described in said Nolde application. With the #1 clutch 400 engaged in the manner described above, the main clutch drives through shaft 351, the ordinal clutch 400 associated therewith, the gear 391, the gear 401 and the crawl carry gearing to advance the numeral wheel one digital increment.

From the foregoing description of the selection mechanism, it will be apparent that the provision of the same or substantially the same number of orders in the actuating mechanism as there are in the accumulator, together with the provision of a shiftable multiple order selection storing carriage, makes possible the entry of a multiple order factor into various groups of orders of the actuating means. Also, since the engagement of the clutches 400 is maintained during an actuating operation, the selection storing carriage may be shifted to the next order of the actuating means during the operation of the latter. In this way a substantial saving in the over-all operating time of the machine in performing a calculation is effected.

*Accumulator or product register*

The register 100 may be of any desired conventional construction but in the present machine it is preferred to employ a register of the general duplexing type such as that disclosed in a Patent No. 2,222,164, issued November 19, 1940, wherein the tens carrying operation is performed simultaneously with the digitation operation by means of a "crawl" type tens carrying mechanism. Partial tens carry is backed out of the numeral wheels upon completion of digitation by means of a "correction at entry" compensating mechanism such as that disclosed in a Patent No. 2,089,682, issued August 10, 1937.

The specific form of register and compensating mechanism chosen for illustration of the present invention includes a compensation arm 483 (Fig. 2) and a centralizer pawl 467 which are associated with each numeral wheel 461 of the product register. The compensation arm 483 cooperates with a numeral wheel snail cam 482 in well known manner to back out partial tens carry increments and align the numeral wheel. The centralizer pawl 467 is effective after such alignment to centralize the numeral wheel in full digital display position.

The mechanism which controls the above mechanism includes the previously mentioned setting clutch. A setting clutch cam 618 (Fig. 9) operates through the linkage shown to move both the centralizer pawls 467 and the compensation arms 483 of the dividend register to inactive positions and they are latched in such positions during the operation of the actuating mechanism to permit free rotation of the numeral wheels and the respective snail cams. The movement of the main clutch dog 516 to clutch disengaging position to stop the operation of the actuators trips a latch 491 and thus releases the compensating arms 483 and pawls 467 for movement to the active positions shown. The centralizer pawls 755 and the compensation arms 756 for a counter register, described hereinafter, are similarly moved and latched in disabled positions throughout the actuating operations and released at the end of such operations, all as is fully described in said Nolde application.

Revolutions counter

The revolutions counter disclosed herein as the register 101 (Figs. 1 and 2) is of conventional crawl carry type and with the exception of the specific manner in which the numeral wheels are aligned, it is generally similar to the accumulator or dividend register 100.

The register 101 includes the numeral wheels 701 (Fig. 2), each of which is driven by a respective drive gear 703 through a planetary gear train indicated generally at 702. Each gear 703 is driven by a respective ordinal clutch 700 similar to the ordinal clutches 400 of the actuating mechanism for the dividend register. Since the currently operable counter numeral wheel is advanced one digital increment during each cycle of operation of the main clutch and the differential actuators including the clutches 400, there is only one clutch 700 for each order of the counter register.

A shiftable interponent 716 (Fig. 2) similar in operation to the blocking levers 310-319 of the selection storing carriage 301 is provided to cause engagement of one of the ordinal counter numeral wheel clutches 700. A clutch engaging frame 707 and a clutch disengaging frame 731 are provided for the counter numeral wheel clutches 700 and the operation of these frames is similar to the corresponding frames 420, 430 for the clutches 400, all as described fully in the above Nolde application of which this is a division.

The interponent 716 has driving engagement with a worm shaft 718 for shifting of the interponent 716 from one order of the counter register to the next so that successive clutches 700 may be engaged and cause each successive numeral wheel 701 to count the number of times the multiplicand is entered into respective orders of the product register 100. It should be noted that the factor indicator 103 (Fig. 1), described hereinafter also shows the selected multiplier digits, and that register 101 is used mainly in multiplication for accumulation of multipliers. In division, register 101 indicates the quotient digits.

Motor drive mechanism

The motor drive mechanism of the present machine is the same as shown in said Nolde application and includes an electric motor from which three separate drive trains are provided through a main clutch, a shift clutch, and a setting clutch, the construction and operation of each of which being fully described in said application.

Main clutch

As previously mentioned, the main clutch 515 (Fig. 9) drives through a train of gears to rotate the differential actuator shafts 351-359 in amounts proportionate to the values "1" to "9". The zero shaft 350 is locked against driving as previously mentioned.

The main clutch also serves through a suitable drive train shown in said Nolde application to drive the shaft 705 and a currently engaged clutch 700 to enter a single digital increment into a selected order of the counter register 101 during each cycle of operation of the main clutch.

Drive reverse mechanism

A main reverse drive unit, shown in said Nolde application, is operable to reverse the direction of operation of shaft 524 (Fig. 2) to selectively reverse the drive from the main clutch to the actuator shafts 351-359 for the clutches 400 and also to reverse the drive to the drive shaft 705 for the clutches 700. The endwise shifting of shaft 524 is under control of a main reverse solenoid 533 which is diagrammatically illustrated in Fig. 13. A second such drive reverse unit (not shown) is operable in division operations to reverse the drive from the above mentioned shaft 524 to the drive shaft 705 and thereby effect a positive count of the number of negative cycles of operation of the main clutch. The above mentioned drive reverse units are conventional and reference may be had to the above Nolde application for a description of parts not specifically described herein.

Shift clutch

The shift clutch 550 (Figs. 10 and 11) operates to effect ordinal shifting movement of some of the component parts of the machine including the selection storing carriage 301 (Fig. 2) and the ordinal control interponent 716 of the revolutions counter, as well as various elements of the multiplier control mechanism, described hereinafter. The shift clutch 550 (Fig. 10) is a half revolution clutch and corresponds to the clutch of the same number in the above Nolde application.

The engagement of the shift clutch 550 is under control of the shift control solenoid 559 (Fig. 11) which is energized as shown hereinafter to move a clutch control dog 556 (Fig. 10) to clutch engaging position.

Each cycle of operation of the ½ revolution shift clutch 550 drives the cam 567 (Figs. 11 and 12) a full revolution. This cam operates through a follower 568 and an actuating pawl 569 to advance a shift ratchet 571 one step for each half-revolution or cycle of shift clutch operation, the holding pawl 572 engaging successive teeth of ratchet 571 to hold the latter in its advanced position.

Each time the ratchet 571 is advanced one step, various ordinally shiftable elements of the machine are shifted one order. These elements include the selection storing carriage 301 (Fig. 2) shiftable by means of the worm shaft 308, and the counter actuating means interponent 716 shiftable by means of the worm shaft 718 described above. The shift drive is transmitted from ratchet 571 to the worm shafts 308 and 718 by respective gear trains described in detail in said Nolde application.

Setting clutch

A setting clutch which is fully described in the last mentioned application operates to condition the machine for subsequent operation under control of the main clutch.

The setting clutch drives the sleeve 612 (Fig. 9) to rotate various cams including cam 618 which operates through follower 488 and the linkage shown to move the numeral wheel centralizer pawls 467 and 755 and the compensation arms 483 and 756 to the disabled positions described hereinbefore. Setting clutch cam 613 operates through follower 631 and shaft 508 to move the main clutch dog 516 to clutch engaging position. As shown diagrammatically in Fig. 13, the setting clutch cam 619 closes a switch 630 in the circuit of the shift clutch solenoid 559 during the cycle of rotation of the setting clutch. Two setting clutch cams (not shown) operate early in the setting clutch cycle to move the clutch disengaging frame 430 (Fig. 2) and the clutch engaging frame 420, in a manner described fully in said Nolde application, to cause selective engagement of the numeral wheel clutches 400.

Multiplication

In general, the multiplying mechanism is under control of nine electro-magnets representing the values one to nine inclusive. During the entry of the multiplier into the second factor receiving device or indicator 103 (Fig. 1) by the numeral keys 110 to 119, the successive depressions of the keys close corresponding ones of a plurality of ordinal rows of switches which represent the successive digits of the multiplier factor. The multiplier digits may therefore be set up in rapid succession and are stored for subsequent use to control multiplication by each successive multiplier digit. Each switch, in sequence, starts the current ordinal multiplying operation and energizes one of the above electro-magnets corresponding to the value of the current multiplier digit. The energized magnet controls the cyclic operation of the machine in accordance with the value of the magnet energized, and during such operation, ordinal shifting devices are brought into play to enable the second closed switch to initiate and control the multiplying operation by the second multiplier digit immediately upon completion of the preceding operation. In this manner, multiplications by the successive multiplier digits are effected without interruption by the shifting devices.

Multiplier selection mechanism

After a multiplicand value has been entered into the selection storing carriage, the multiplication key 123 (Fig. 6) is depressed to shift or escape the selection set-up carriage from operative relation with the selection storing carriage into operative relation with a multiplier selection mechanism. This key 123 operates through an ear 801 to rock a bell crank 802 which is connected by a link 803 with a bell crank 802a associated with the negative multiplication key 124. The link 803 has connected thereto a spring 804 which urges the bell cranks 802 and 802a and the keys 123 and 124 to the raised positions shown in Fig. 6. The link 803 carries an ear 806 which is adapted to engage an arm 807 carried by a shaft 808. The latter carries the support arms 275 of the escapement rack 273 with which rack the selection setting carriage is associated during set-up of the multiplicand. The rack 273 is normally held in active position by the spring 809 which urges the arm 807 against a stop pin 811. Upon depression of either of multiplication keys 123 or 124 the escapement rack 273 is lowered out of engagement with an escapement pawl 271 of the selection setting carriage 211 so that this carriage can move to the right through the unset orders of multiplicand selection mechanism until it becomes engaged with the first tooth of the rack 273a (Fig. 4) of the multiplier selection mechanism. The rack 273a is similar to the rack 273 of the multiplicand selection mechanism so that depression of any key 110—119 causes a one order escapement of the selection set-up carriage along this escapement rack 273a.

In the highest order position relative to the multiplier selection mechanism the set-up carriage 211 is to the right of the multiplicand selection storing carriage 301 so that no setting of the selection storing carriage will occur during further operation of the selection set-up carriage for setting up the multiplier. Also, the setting levers 220 through 229 (Fig. 4) have their lower ends operatively related to the highest order of the multiplier selection mechanism including blocking interponents 820 through 829 similar to the levers 250 through 259 of the multiplicand selection mechanism.

These interponents 820 through 829 cooperate with the stop slides 831—831a (similar to the differentially settable slides 237—237a previously described) and which slides operate to set the numeral wheels of the right factor indicator 103. Each ordinal series of blocking interponents 820 through 829 carry on their respective pivot shafts 832 a depending arm 833 (Figs. 3 and 4) of insulating material which has a metal tip 834 adapted to be placed between an associated pair of an ordinal series of spring contacts 840 through 849, respectively. These sets of contacts which are located in each order of the multiplier selection mechanism are shown schematically in Fig. 13. Upon the setting of any multiplier digit, a corresponding pair of contacts of a series 840 through 849, will be closed by the metal tip 834 of the associated multiplier selection arm 833 and this circuit closing is utilized to start the operation cycle of the machine and to select the number of cycles of operation of the machine.

The circuit established by the above described circuit control is utilized to energize the setting clutch solenoid 931 to cause operation of the setting clutch and also to energize a selected corresponding multiplier buss 921—929 which controls a multiplier magnet 851—859 to cause adjustment of a multiplier rack 893 (Fig. 8) to a position corresponding to the value of the current multiplier digit. When the multiplier rack is displaced from its normal position, the latch 936 is conditioned to engage and hold out the main clutch dog upon the operation thereof regardless of whether the rack be displaced one or nine increments.

Figure 5:
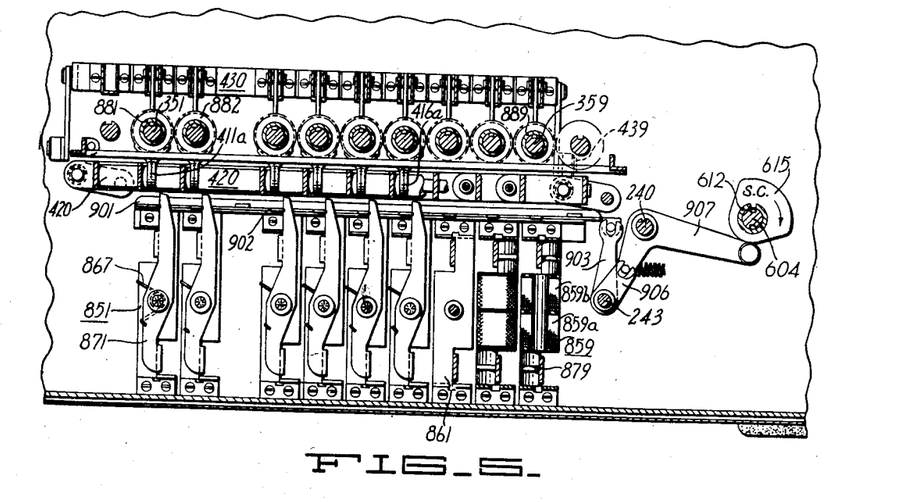
Fig. 5 is a sectional elevation, as viewed from the right, showing the multiplier magnets and associated multiplier mechanism, the section being taken on the line 5—5 in Fig. 3.

Referring to Figs. 3 and 5, there is provided a series of nine multiplier magnets 851 through 859. The multiplier magnets are of the double winding type having both actuating windings 851b—859b (Figs. 5 and 13) and bias windings 851a—859a respectively.

Figure 13:
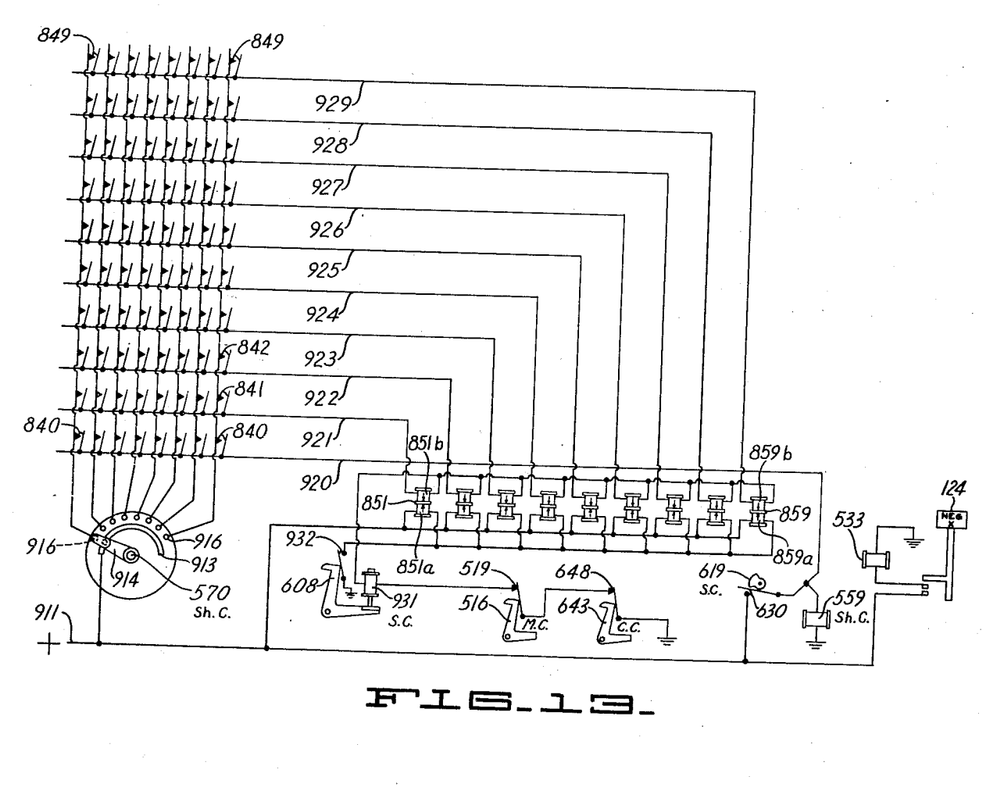
Fig. 13 shows a schematic wiring diagram of the electrical controls associated with the multiplying mechanism.

The control of the operation of the multiplier magnets by the circuit connections therefor is shown in Fig. 13. Upon closing of a contact 840 to 849, a circuit is made from one side of the main line 911 to the commutator strip 913 for the switch arm 914. The switch arm 914 is engaged with one of a series of contacts 916 associated with the ordinal sets of switches 840 through 849. The switches 840 through 849 are associated with the "0" to "9" busses 920 through 929 and each of these "1" to "9" busses is in turn connected with the actuating winding 851b through 859b of the magnets 851 through 859. From these magnets, the circuit is connected through a setting clutch start solenoid 931 associated with the clutch dog 608 of the setting clutch. From the magnet 931 the circuit continues through normally closed contacts 519 associated with the main clutch dog 516 and normally closed contacts 648 associated with a clear clutch dog 643 to ground.

Upon energization of the setting clutch solenoid 931, the setting clutch dog 608 is rocked to engage the setting clutch and in this position the dog closes a switch 932 which places the bias windings 851a through 859a of the multiplier magnets in circuit so that these are energized while the setting clutch is being operated. The setting clutch dog 608 is operable upon movement to clutch engaging position to close a switch in the circuit of the motor and maintain operation of the motor as long as the clutch is engaged, all as is described in said Nolde application.

The magnets 851 through 859 (Fig. 5) have respective double ended spring-urged armature levers 871 through 879 associated therewith, and the upper ends of these levers 871 through 879 are normally held in an inoperative position as shown by respective ears 902 on an armature holding slide 901 more fully described hereinafter.

The above described energization of the bias windings 851a—859a creates magnetic fields which hold the armatures associated therewith against the cores of the magnets except the magnet which had its actuation winding selectively energized. In the latter case the energization of the actuating winding neutralizes the effect of energization of the bias winding and when the armature holding slide 901 is moved to the left as described below, the armature associated with the neutralized magnet will move counter-clockwise to follow the slide under the urgency of a torsion spring 867.

At its right end, as viewed in Fig. 5, slide 901 has a pin which is embraced by the fork of an arm 903 fixed to shaft 243. The latter carries a second arm 906 having a bifurcated tip engaged with a pin on the bell crank 907 keyed for limited rotation on the shaft 240 and providing a cam follower for the cam 615 operated by the setting clutch. During operation of the setting clutch the slide 901 will be moved to its leftmost position and the selected armature 871—879 will move counter-clockwise as described above.

Figures 6, 7, 8:
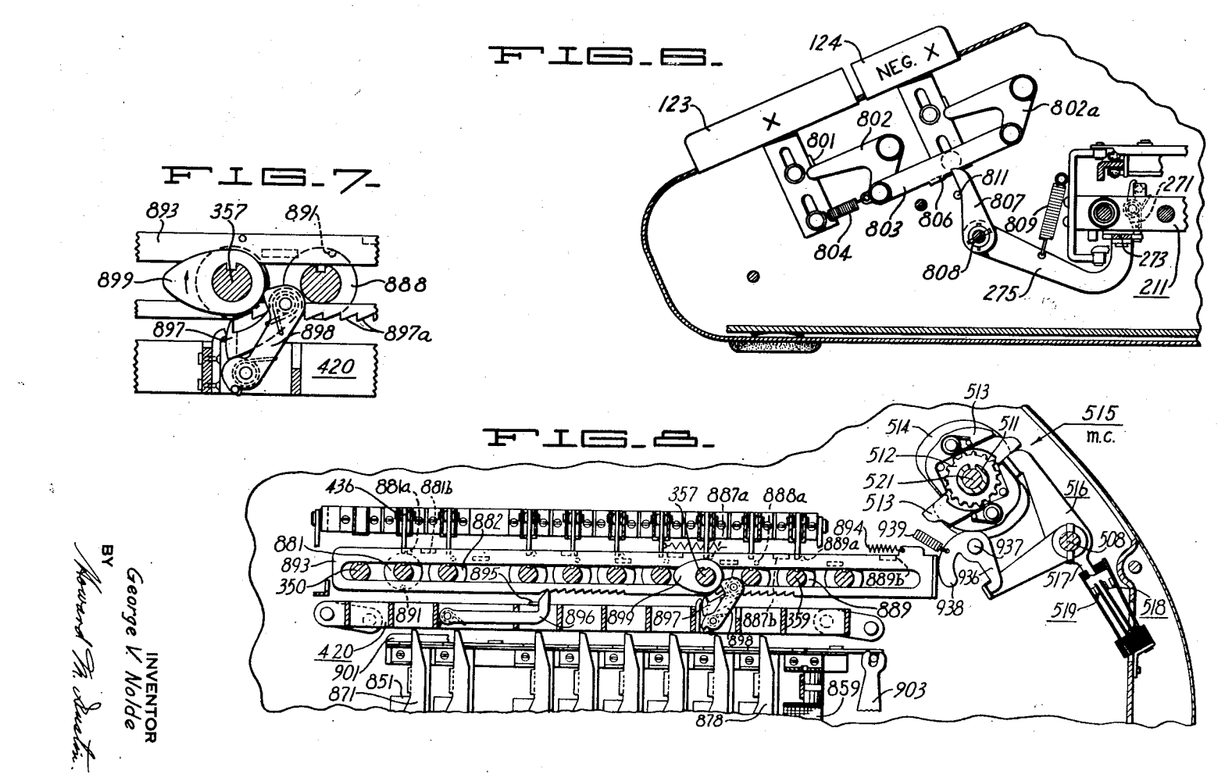
Fig. 6 is a right side view of the multiplier control keys and related selection set-up carriage escapement mechanism.
Fig. 7 is an enlarged view of a portion of the multiplier control mechanism shown in Fig. 8.
Fig. 8 is a sectional elevation, as viewed from the right, showing a portion of the multiplier control mechanism, the section being taken on the line 8—8 in Fig. 3.

Associated with the armature levers 871 to 879 are a series of setting forks 411a to 419a (Figs. 3 and 5) carried by the clutch engaging frame 420 of the multiplicand selection mechanism. The forks 411a to 419a are operative with respect to a series of settable collars 881 through 889 which are free on the shafts 351 through 359 and each collar is held against rotation by slideable engagement of each with a pin 891 (Fig. 3). The collars 881 through 889 carry respective stop projections 881a through 889a (Figs. 3 and 8) for engagement with a series of ears 881b—889b on the control rack 893 (Fig. 8).

Starting with the number "1" stop projection 881a and progressing toward the number "9" projection 889a, the spacing between a given projection 881a—889a and its respective ear 881b—889b becomes progressively greater. It will be noted that in some cases a given ear, the "7" ear 887b, for example, does not lie adjacent its respective projection 887a but lies beyond the next projection 888a; therefore, the projections and ears are so arranged as to provide a clearance between a projection of one value with an ear of another value. Alternate projections 881a—889a are off-set vertically as are their respective ears 881b—889b; thus, ear 887b may slide over and past projection 888a to be engaged by projection 887a, and in all other cases where an interference would otherwise be possible the same provision exists.

The rack 893 (Fig. 8) is slideable on the shafts 351 through 359, and is urged to the left by a spring 894. The rack is normally held against such movement by a holding pawl 896 carried by the frame 420. The latter carries an ear 895 which, upon dipping of frame 420, withdraws pawl 896 from engagement with rack 893, the arrangement being that frame 420 will have been dipped sufficiently to effect the setting of a stop collar 881—889 before the ear 895 engages the pawl to effect the release of rack 893.

It will be noted that the leftmost series of disengaging fingers 436 (Fig. 3) carried by the clutch disengaging frame 430 will serve upon movement of this frame to restore any set stop collar of the series 881 through 889 in the same manner that the accumulator actuator clutches 400 are restored.

Figure 9:
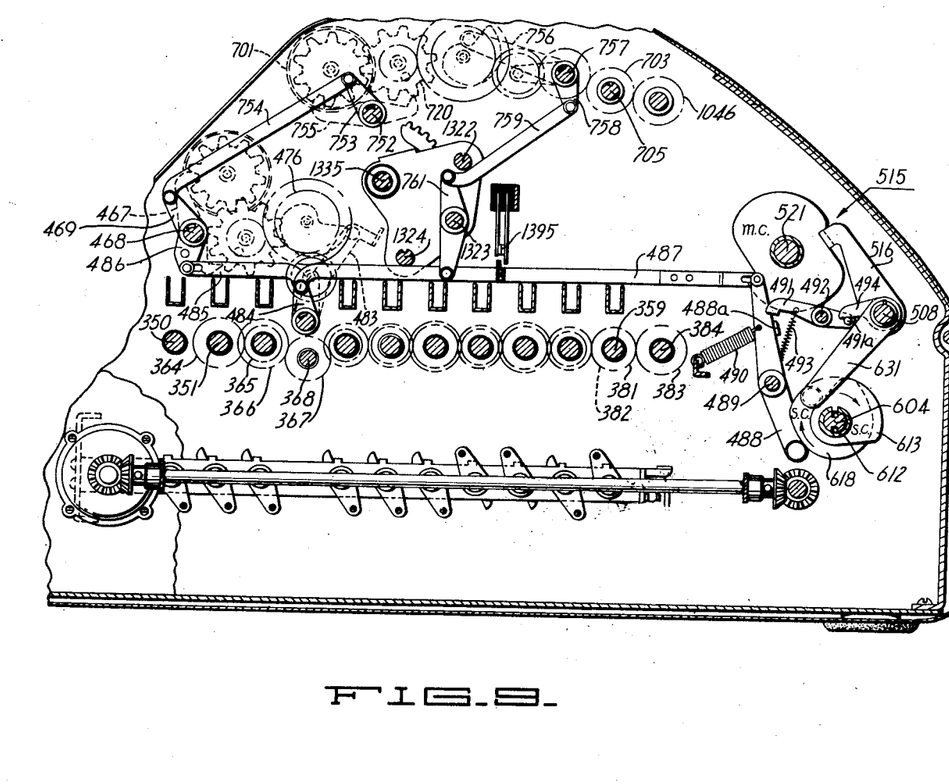
Fig. 9 is a right side view of the machine with certain parts omitted, illustrating the controls for the centralizer pawls and compensator arms of the registers.

It will be recalled that the operation of the setting clutch causes engagement of the main clutch after the various control functions of the setting clutch are performed, and when the main clutch starts to operate by virtue of the rocking of its clutch dog 516 (Fig. 8) by setting clutch cam 613 as explained hereinbefore, the switch 519 (Figs. 8 and 13) is operated to open the circuit of the setting clutch solenoid. Also, the latch 936 (Fig. 8) on the shaft 937 is free to latch the main clutch dog 516 in clutch engaging position. This latching operation can occur because the arm 938 on lever 936 has been able to rock clockwise under the influence of the spring 939 due to the setting of the multiplier control rack 893.

The rack 893 is returned to its normal rightmost position during the operation of the main clutch by means including a feed pawl 897 (Figs. 7 and 8) carried by an arm 898 pivoted on the frame 420 and spring-urged against a cam 899 on the shaft 357. When cam 899 rotates, feed pawl 897 engages successive teeth 897a on the multiplier control rack 893 and the latter will be returned step by step to the position shown in Fig. 8, the holding pawl 896 yielding during such return movement. In this connection the geared drive of the actuator shafts 351—359 is such that the shaft 357 carrying the cam 899 is rotated once during each cycle of operation of the accumulator actuating means. When the control rack 893 is returned to the position shown in Fig. 8, it rocks the arms 938 and 936 counter-clockwise to release the main clutch dog. This release of the main clutch dog occurs during the last cycle or step of movement of the rack 893.

Summarizing the foregoing operations of the multiplier control mechanism, it may be seen that energization of a given multiplier magnet 851—859 (Fig. 8) and consequent actuation of its armature moves the top thereof into position to block the fork 411a—419a (Fig. 5). Dipping of the frame 420 moves one of the stops 881a—889a into position to block leftward movement of the slide 893, the amount of such movement being proportional to the value of the multiplier digit. The movement of the slide also releases latch 936 to enable it to latch the main clutch dog 516. During the cyclic operation of the main clutch, the cam 899 and the pawl 897 actuated thereby, steps the slide back toward the right. When the slide reaches its initial position it trips latch 936 and stops the main clutch after operating through the number of cycles corresponding to the current multiplier digit.

It will be noted that the operation of entering the multiplier digits in the multiplier selection mechanism can proceed independently of the machine operation without affecting the current ordinal multiplication because the multiplier switch arm 914 (Fig. 13) must be advanced one step by the shift clutch before the next ordinal multiplying control circuit can be enabled, as explained hereinafter, and also because the switch 519 of the multiplier magnet control circuit is open while the main clutch is engaged. From the foregoing explanation it will be seen that either the entire multiplier figure can be entered in rapid succession and the machine will multiply by one digit after another, or if there is a delay between entry of digits, the machine will stop at the end of any ordinal multiplication and wait for entry of the next multiplier digit.

Figure 10:
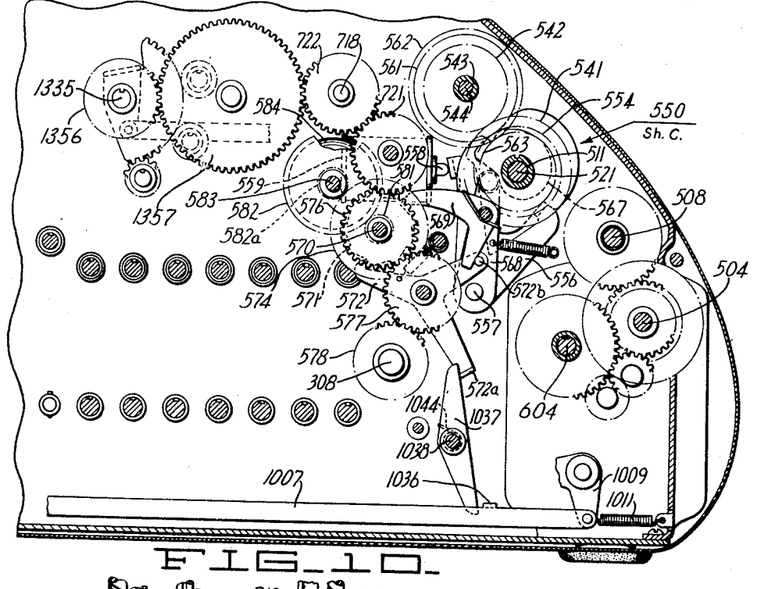
Fig. 10 is a right side sectional view of the shift clutch and associated mechanisms.
Figures 11, 12:
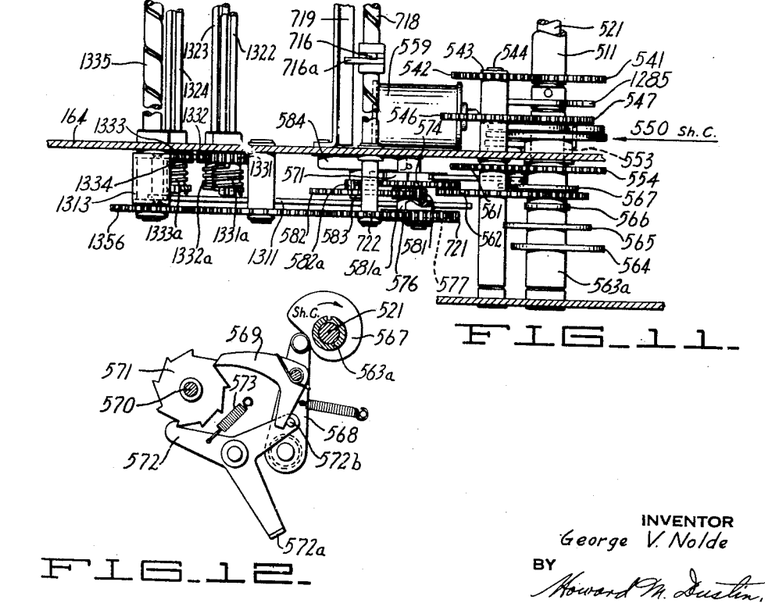
Fig. 11 is a fragmentary plan view of the shift clutch and associated mechanisms.
Fig. 12 is a detailed view of a portion of the shaft drive mechanism shown in Fig. 10.

As previously stated, the various orders of the multiplier selection mechanism are brought into play sequentially from the highest order through the lowest order, and to effect the sequential control of the various orders of the multiplier control switches or contacts 840 through 849, the switch arm 914 (Fig. 13) is moved from one contact 916 to the next and in so doing connects into the control circuit each successive series of contacts 840—849. Switch arm 914 is pinned to shaft 579 which as seen in Fig. 10 is operated by the step by step advance of the shift ratchet 571. In this manner the shift arm 917 (Fig. 13) is moved from ordinal series of contacts 840—849 to the next during the cycle of operation of the shift clutch which occurs during each ordinal multiplication.

Referring again to Fig. 13, it will be noted that the "0" buss 920 is connected through the shift clutch control solenoid 559 to ground so that any time a "0" multiplier setting becomes effective, an automatic operation of the shift mechanism is determined.

*Multiplication operation*

In conditioning the machine for a multiplying operation, the first step is to enter the multiplicand into the selection storing carriage 301 which will be briefly reviewed. At the beginning of an operation the selection storing carriage is in its leftmost position, as illustrated in Fig. 3, and the selection set-up carriage 211 is also in its leftmost position in alignment with the highest order of the selection storing carriage.

The multiplicand is entered by depression of the appropriate keys 110—119 (Fig. 1) of the keyboard and as the first key is depressed the appropriate setting lever 220—229 (Fig. 2) of the selection set-up carriage is operated to set the associated blocking lever 311—319 in the aligned order of the selection storing carriage to active position. Also, the active lever of the series 220—229 will move the associated factor indicator blocking interponent of the series 250—259 (Figs. 2 and 3) to set the value selected in the factor indicator 102. At the same time the selection set-up carriage is escaped one order to the right to a position of alignment with the next order of the selection storing carriage. If the "0" key 110 is operated, the zero setting of the aligned order of the selection storing carriage 301 is unchanged and the selection set-up carriage is shifted to the next order. In this connection, it may be noted that suitable full stroke mechanism may be employed in connection with the keys 110 through 119 so that the functions of these keys to set one of the blocking levers 310—319 and an interponent 250—259, and to control the shift of the selection set-up carriage must all be completed after initial depression of the keys are started. The above sequence of operations occurs in each ordinal position of the selection set-up carriage until the various ordinal values of the multiplicand are represented in the selection storing carriage by the adjusted positions of the respective series of blocking levers 310—319 in the various orders, and the multiplicand is displayed in the left factor indicator 102.

Figure 4:
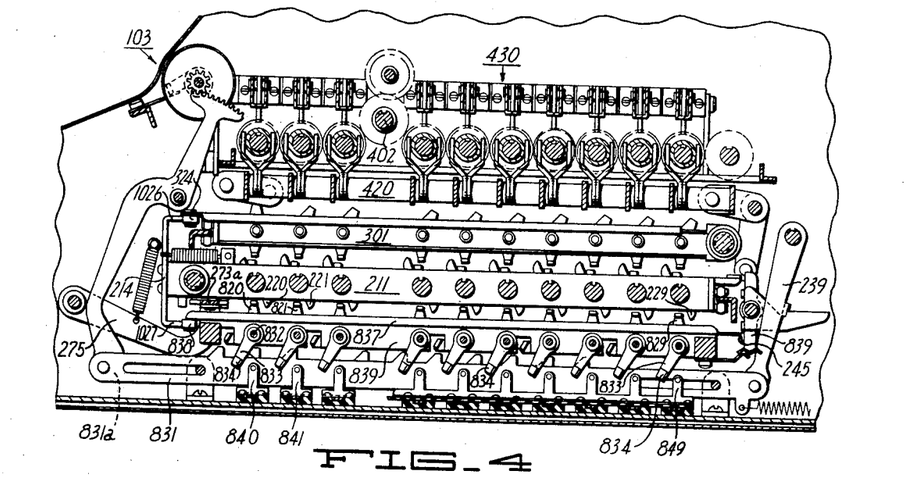
Fig. 4 is a sectional elevation, as viewed from the right, showing the multiplier selection mechanism, the section being taken on line 4—4 in Fig. 3.

After the multiplicand has been entered in the selection storing carriage, as described above, the multiply key 123 (Fig. 1) is operated to rock the support arms 275 (Figs. 4 and 6) for the selection set-up carriage escapement rack 273 so that the selection set-up carriage is free to escape to the right through any unset orders of the selection storing carriage and stop in the highest order position of the multiplier selection mechanism where it engages the highest order tooth of the fixed escapement rack 273a (Fig. 4).

Figure 14:
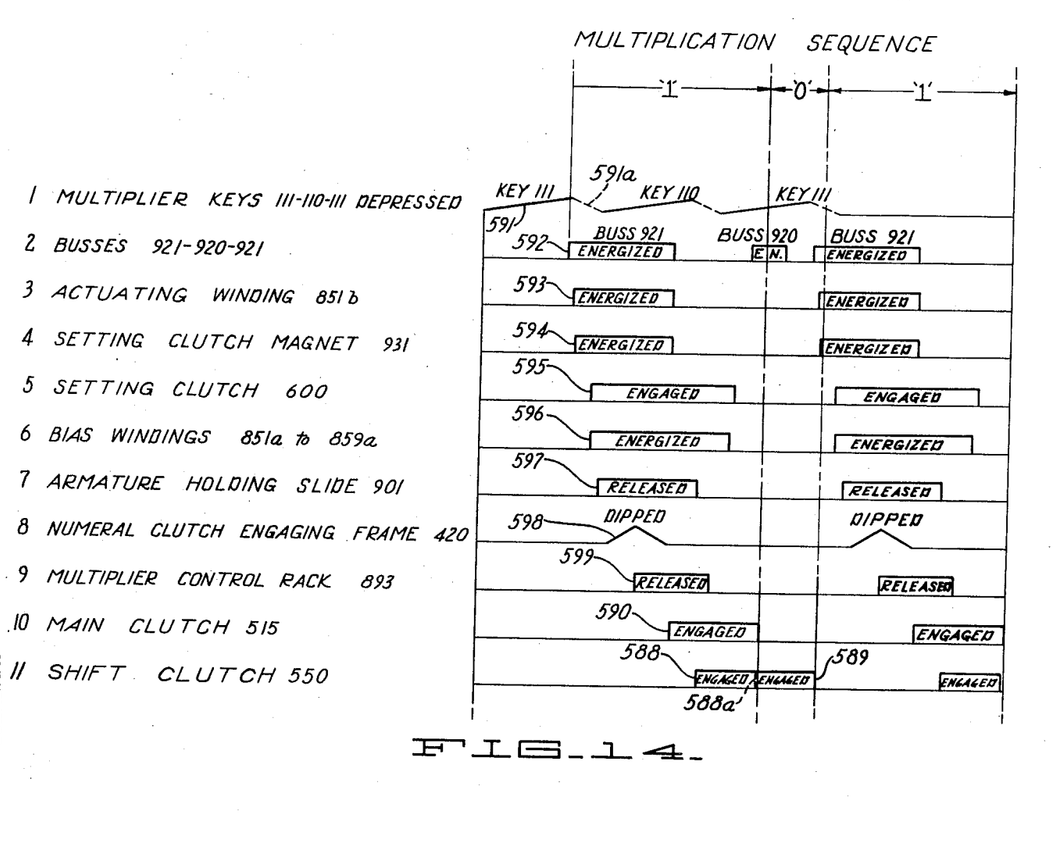
Fig. 14 is a timing diagram of a typical multiplying operation.

Fig. 14 is a timing chart illustrating the sequence of operation of various mechanisms as caused by the sequential depression of multiplier keys 111, 110 and 111 representing a multiplier value of 101. The depression of a key is indicated in solid lines as at 591 of line 1, and the release of a key is indicated by dotted lines as at 591a of line 1. It will be noted that the multiplier keys 111, 110 and 111, are depressed in rapid succession so that the machine is conditioned to operate continuously from order to order.

The depression of the "1" key rocks the "1" setting lever 221 (Fig. 4) to operate the blocking interponent 821 associated therewith so that the value "1" appears in the highest order of the multiplier factor indicator 103. At the same time the arm 833 connected with the interponent 821 closes the circuit through the contacts 841 (Figs. 4 and 13) of the multiplier circuit, so that the "1" buss 921 of this circuit is energized as indicated at 592 of line 2 (Fig. 14) and correspondingly energizes the actuating winding 851b of the "1" multiplying magnet 851 as illustrated at 593 of line 3. Also, the closing of this circuit energizes the setting clutch engaging solenoid 931 (Fig. 13) so that this clutch is engaged and its cycle of control operations will commence as shown at 595 of line 5 (Fig. 14).

As previously mentioned the operation of the setting clutch dog closes a switch in the motor circuit, and also closes the switch 932 (Fig. 13) which energizes the bias windings 851a—859a of the multiplier magnets 851—859 as shown at 596, line 6 (Fig. 14); thus, when the engagement of the setting clutch is first initiated, the multiplier control circuit is properly conditioned for operation in accordance with the value of the depressed multiplier key.

The operation of the setting clutch during its cycle of movement performs several control operations in effecting the calculating operation. The setting clutch operates through suitable cams previously mentioned to operate the differential clutch engaging disengaging frames 420 and 430, respectively, to enter the multiplicand value set in the selection storing carriage into the aligned orders of the actuating mechanism, and the timing of this operation is such that it occurs early in the cycle of the setting clutch, as indicated at 598 of line 8 (Fig. 14).

The setting clutch operates through the cam 618 (Fig. 9) both to move the centralizers for the accumulator register 100 and the revolutions counter 101, as well as the compensator arms for these registers to ineffective position so that these registers are free to operate without interference.

A further step in conditioning the machine for the multiplying operation is the adjustment of the multiplier control rack 893 (Fig. 8) to the value represented by the depressed multiplier key. This rack is adjusted by the setting clutch under control of the energized multiplier electro-magnet. After the setting clutch operates to control the adjustment of the multiplier control rack 893, it operates through the cam 613 (Fig. 9) to rock the main clutch dog 516 and engage the main clutch as indicated at 599 of line 10 (Fig. 14). The movement of the clutch dog 516 (Fig. 13) not only starts the drive of the actuating means, but also interrupts the circuit of the setting clutch magnet 931 so that the setting clutch cannot be engaged again while the main clutch is operating. The main clutch dog 516 (Fig. 8), when rocked to clutch engaging position, is latched in this position by the latch arm 936 and will remain so latched until the multiplier control slide 893 is returned to its normal inactive position as shown in Fig. 8 through the operation of the pawl 897 and the cam 899. In the instant case, one cycle of operation of the actuating means is determined by the positioning of the slide 893.

After engagement of the main clutch, the setting clutch continues to operate until it completes its current cycle and operates through the cam 619 (Fig. 13) to close the switch 639 and energize the shift clutch control magnet 559 so that the shifting mechanism is brought into operation as indicated at 588 of line 11 (Fig. 14) at the same time that the actuating means is effecting a digitation operation. It should be noted that the shifting operation is completed during the first cycle of operation of the main clutch (line 10) regardless of whether the main clutch is engaged for one or nine cycles. The one cycle operation of the shift clutch serves through the cam 567 (Fig. 12) to drive the ratchet 571 one step, and through a gear train previously mentioned, drives the worm shaft 308 (Figs. 2 and 10) for the selection storing carriage so that this carriage is moved to the next lower ordinal position where its highest order is aligned with the second highest order of the actuating mechanism. Also, the ratchet 571 operates through a gear train to rotate the worm shaft 718 (Fig. 2) for the revolutions counter interponent 716 so that this interponent is similarly shifted during the time that a count is being entered in the highest order of the revolutions counter. During the cycling of the product register actuating means, the product will be entered into the register 100 in either a positive or negative fashion in accordance with the setting of the main reverse mechanism which, in the present case, is set for positive operation when the reverse magnet 533 (Fig. 13) is not energized. If the negative multiply key 124 (Fig. 6) had been operated, the solenoid 533 (Fig. 13) would be energized and negative entry of the selected values would be effected. The sign character of the entry of the multiplier in the revolutions counter 101 is controlled by the selective energizations of the main reverse magnet 533.

During the first cycle of operation of the actuating means, which in the case of the present example is by a multiplier of "1," the multiplier control slide 893 is returned to the position shown in Fig. 8 after one cycle and operates through the arm 938 to move the latch 936 to ineffective position so that the main clutch dog 516 is free to move to clutch disengaging position at the end of the first cycle. While the machine is multiplying by a "1," a cycle of the shift clutch is completed as indicated between the solid line 588 (line 11, Fig. 14) and the dotted line 588a, and during such shifting the shift switch arm 914 (Fig. 13) is moved clockwise on to the second contact 916. The widths of contacts 916 and the brush on arm 914 are such that contact is made and in the case of the present example the "0" buss 920 is energized to cause operation of the shift clutch solenoid 599 while the shift clutch is still operating. In this manner the shift clutch dog is rocked to and held in clutch engaging position at the time the first shift clutch cycle normally would end and the shift clutch therefore continues to operate and complete two cycles of operation without interruption thereof. If more than one zero were to appear between the two significant digits "1" and "1" then the shifting of the switch arm 914 would cause continuous operation of the shift clutch for as many cycles as there were zeros. It will be noted that in all cases where the higher order significant digit is approximately as great or greater than the number of zeros following it, that the plurality of shifting operations would be completed concurrent with or prior to the completion of the higher order multiplication and there is no delay between the higher and lower order multiplying operations. With regard to the foregoing example of multiplying by a value of "101," and the shifting operation caused by the multiplier setting of "0," which is indicated between dotted line 588a and solid line 589 on line 11 (Fig. 14) such shifting causes the shift arm 914 to be shifted clockwise to the third contact 916 (Fig. 13). This causes energization of the "1" buss 921 during the latter part of the shift cycle and starts a sequence of operations identical to that started by the previous energization of buss 921.

From the above description it will be seen that the multiplier control system, as disclosed herein, provides for continuous operation of the machine as long as multiplier digits are set into the machine and when the number of ordinal multiplications corresponds to the number of set multiplier digits the operation of the machine will stop. It will further be observed that no extra time is required between successive ordinal multiplying operations for the relative ordinal shifting between the parts, such shifting being effected simultaneously with a product entering operation.

I claim:

1. In a calculating machine having a plural order register, cyclically operable plural order actuators therefor, a receiving device settable to represent the numeral value of a multiplicand factor and operable to control said actuators, cyclically operable shifting mechanism for associating the receiving device with various respective orders of the actuators, actuator drive means operable to cause a variable number of cyclic operations of the actuators, and shift drive means operable to cause a variable number of cyclic operations of the shifting mechanism; the combination of, a second factor receiving device settable to represent a plurality of multiplier digits, operation initiating means for causing concurrent operation of said actuator drive means and said shift drive means, means controlled by a part of the second factor device to maintain operation of the actuators by the actuator drive means through the number of cycles corresponding to the value of a significant digit of the multiplier factor, and means operable in response to operation of the shift drive means and controlled by another part of the second factor receiving device to maintain operation of the shifting mechanism by the shift drive means through a number of cycles dependent upon the number of zeros immediately following said significant multiplier digit.

2. In a calculating machine having a plural order register, cyclically operable plural order actuators therefor, a receiving device settable to represent a multiplicand value and operable to control said actuators, cyclically operable shifting mechanism for associating the receiving device with various respective orders of the actuators, actuator drive means operable to cause a variable number of cyclic operations of the actuators, and shift drive means operable to cause a variable number of cyclic operations of the shifting mechanism; the combination of, a second factor receiving device settable to represent a plurality of multiplier digits, operation initiating means for causing concurrent operation of said actuator drive means and said shift drive means, means controlled by the second factor receiving device to maintain operation of the actuators by the actuator drive means through the number of cycles corresponding to the value of a significant digit of the multiplier factor and to maintain operation of the shifting mechanism by the shift drive means through a number of cycles dependent upon the number of zeros immediately following said significant multiplier digit.

3. In a calculating machine having a register, differential actuators for entering values into the register, drive mechanism for said actuators, multiplier control mechanism including multiplier selection mechanism and an ordinally adjustable element for successively bringing into play different orders of the multiplier selection mechanism to control successive multiplying operations; the combination of, shifting mechanism for effecting ordinal adjustment of said control element, means for initiating concurrent operation of the actuator drive mechanism and the shifting mechanism, and means operable under control of the multiplier selection mechanism to terminate operation of the actuator drive mechanism, with means responsive to adjustment of said control element by said shifting mechanism to condition said initiating means for operation, and means controlled by said terminating means upon operation thereof to render said conditioning means effective to cause operation of said initiating means.

4. In a calculating machine having a register, differential actuators for entering values into the register, drive mechanism for said actuators, an ordinally adjustable plural order selection storing mechanism for controlling entry of values into the actuators, multiplying mechanism including multiplier selection mechanism and control means for successively bringing different orders of the multiplier selection mechanism into controlling relation with respect to the actuator drive mechanism; the combination of, shifting mechanism for effecting ordinal adjustment of said control means and said selection storing mechanism, means for initiating concurrent operation of the actuator drive mechanism and the shifting mechanism, and means operable by said multiplier selection mechanism to terminate operation of the actuator drive mechanism, with means controlled jointly by said multiplier control means upon adjustment thereof by said shifting mechanism and by said terminating means to cause operation of said initiating means.

5. In a calculating machine having a register, cyclically operable actuators therefor, a selectively settable receiving device, and means for entering a multidigit value into said device; the combination of, actuator control means responsive to said receiving device for controlling operation of the actuators through a number of cycles corresponding to the value of a significant digit entered into said receiving device, cyclically operable shifting mechanism for bringing successive orders of the receiving device into operative relation with respect to said actuator control means, operation initiating means for causing concurrent operation of said actuators and said shifting mechanism, and means controlled by said receiving device to maintain operation of the shifting mechanism through a number of cycles dependent upon the number of zero digits entered into said receiving device immediately following said significant digit.

6. In a calculating machine having a register, cyclically operable actuators therefor, an actuator drive train and a clutch in said train, a multiorder device for receiving a multidigit value including a plurality of elements in each order of said receiving device, means for selectively setting an element in each order of said receiving device to represent a zero digit or one of a plurality of significant digits; the combination of, control means rendered effective by the setting of one of the significant digit representing elements to control operation of the actuator clutch through a number of cycles corresponding to the digital value represented by said element, shift means ordinally adjustable to associate said control means with successive orders of said receiving device, a drive train for said shift means, a cyclic clutch in said train and operable during each cycle thereof to ordinally adjust said shift means, operation initiating means for causing substantially simultaneous engagement of said actuator clutch and said shift clutch, shift control means responsive to said zero representing elements to maintain engagement of said shift clutch through the number of cycles dependent upon the number of zero representing elements that are set in adjacent orders of the receiving device.

GEORGE V. NOLDE.

REFERENCES CITED

The following references are of record in the file of this patent:

UNITED STATES PATENTS

| Number | Name | Date |
|---|---|---|
| 2,273,251 | Chase | Feb. 17, 1942 |
| 2,374,333 | Crosman | Apr. 24, 1945 |
| 2,377,065 | Avery | May 29, 1945 |
| 2,379,877 | Britten, Jr. | July 10, 1945 |

Certificate of Correction

Patent No. 2,557,457 June 19, 1951

GEORGE V. NOLDE

It is hereby certified that error appears in the printed specification of the above numbered patent requiring correction as follows:

Column 3, line 8, for "shaft" read *shift*; column 13, line 73, for "are" read *has*; column 16, line 74, after "factor" insert *receiving*; and that the said Letters Patent should be read as corrected above, so that the same may conform to the record of the case in the Patent Office.

Signed and sealed this 2nd day of October, A. D. 1951.

[SEAL]

THOMAS F. MURPHY,
*Assistant Commissioner of Patents.*